May 24, 1955 H. A. GARVIE 2,708,805
ANIMATED FISH LURES
Filed Dec. 19, 1952

INVENTOR.
HUGH A. GARVIE
BY Martin E Anderson
ATTORNEY

United States Patent Office 2,708,805
Patented May 24, 1955

2,708,805
ANIMATED FISH LURES

Hugh A. Garvie, Denver, Colo.

Application December 19, 1952, Serial No. 326,982

3 Claims. (Cl. 43—42.15)

This invention relates to improvements in fish lures of the type designed to be drawn through the water to effect a wiggling or erratic movement of the fish hook or other bait in simulation of the movements of a minnow.

The invention relates to the construction of a device which is attached to the end of the fish line and to the fish hook plug or other fish lures to give the desired erratic darting, diving and wiggling movements thereto.

It is the object of this invention to produce a device for the purpose specified which shall be of a simple and substantial construction that can be manufactured at a comparatively small expense and in any desired size.

Another object is to produce a device of the type specified that shall be capable of imparting to the bait a succession of changes of direction and to thereby simulate the movements of an exceedingly active minnow or bait fish.

In order to explain the invention so that its construction and operation can be readily understood reference will now be had to the accompanying drawing in which the invention has been illustrated and in which Figure 1 is a side elevational view showing the several parts in assembled relation;

Figure 1:
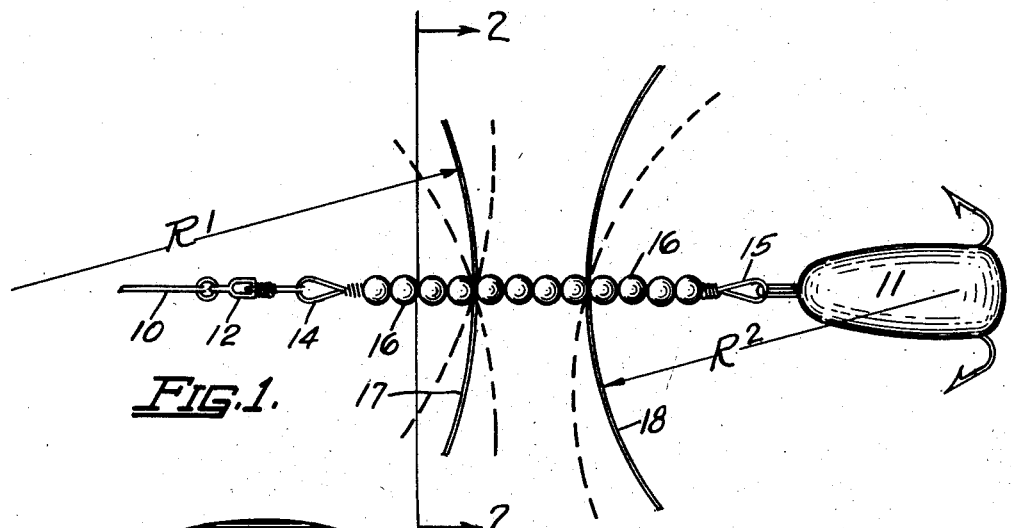
Figure 2:
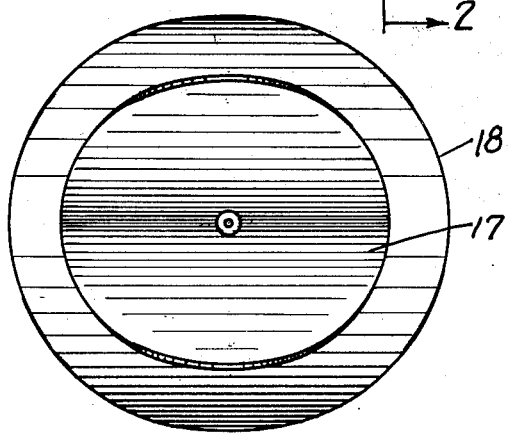
Figure 2 is a view taken looking through plane 2—2 Figure 1.

Referring now to the drawing reference numeral 10 designates the fish line and 11 the bait which has been shown as of the plug type, any other form of bait can, of course, be substituted.

The invention to which this application relates forms a connection between the end of the fish line 10 and the bait and may be connected to the fish line by a swivel 12. The shank 13 instead of being rigid as in most similar devices is quite flexible and may be formed from a soft copper wire, which may be stranded for greater flexibility, or it may be a nylon cord. The shaft is provided at its ends with eyes 14 and 15.

After eye 14 is formed a number of glass beads 16 are applied to the shank, in this case four have been shown, deflector disk 17 is then applied after which an additional number of beads (four shown), are applied followed by the larger deflector disk which has been designated by numeral 18 and this in turn is followed by four beads. Eye 15 is now formed and serves as a stop for the assembly of beads and disks as shown. The beads on opposite sides of the disks and in contact therewith will be referred to as bearings. The bait, of whatever nature, is attached to eye 15 as shown.

Figure 3:
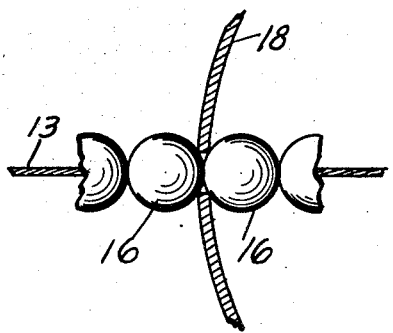
Figure 3 is a fragmentary view showing one of the disks in section and its relation to the bearing members between which it is positioned.
Figure 4:
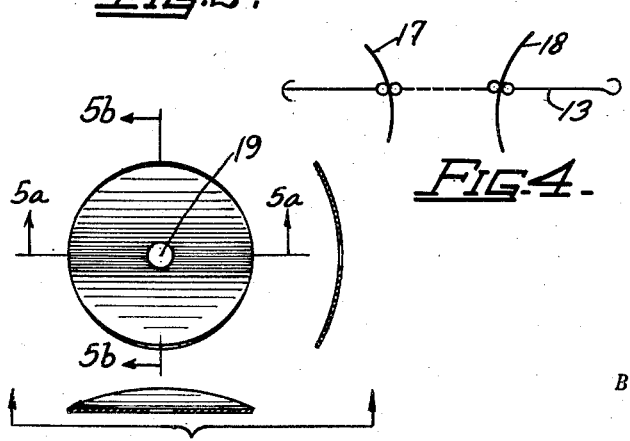
Figure 4 is a diagrammatic view illustrating one tilted position of the deflector blades or disks and Figure 5 is a view showing a front side and two sectional views of a deflector disk.
Figure 5:
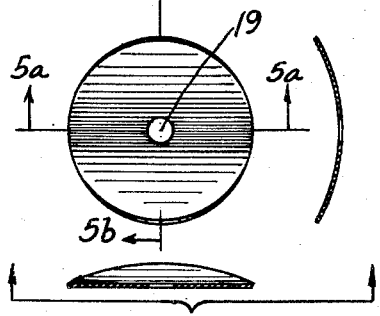

Disks 17 and 18 differ in size only, disk 17 being the smaller. Each disk is formed from a circular sheet of aluminum, or any other metal or from any other sheet material such as plastic. The surfaces of the disks may be polished to form good light reflectors and/or they may be colored. The disks are curved to form cylindrical surfaces whose radii have been designated by R1 and R2 in Figure 1. The curvature may be the same or different as desired. From Figure 1 it will be seen that disk 17 has its concave surface facing forwardly (towards the fish line) and disk 18 has its convex surface facing forwardly. Each disk has a central opening 19 which is larger than the shank 13 but smaller than the bearing beads and the latter are held in close contact by shank 13 so that the disk will ride on the beads as indicated in Figure 3. This arrangement provides a freer movement through a greater angle than if the holes were just sufficient to receive the shank. Disks 17 and 18 are free to turn as well as to tilt and the axes of curvature of the disks will therefore rotate haphazardly causing the device to follow a very erratic path when drawn through the water. In Figure 1 two tilted positions have been indicated by broken lines.

The fact that the shank is flexible permits that portion between the disks to bend which further increases the erratic movement of the bait and gives a decidedly different effect than if the disks were positioned in spaced relation on a rigid shank, and this feature is of special importance because it is obvious that when the disks are connected by a flexible shank or member they may tilt relative to each other even if they do not tilt relative to the shank at the point of attachment thereto.

It is to be understood that the sizes of the disks may be varied as desired but the front disk must be smaller than the one nearest the bait and must preferably have its concave side facing towards the fish line. The spacing between the disks may, of course, be varied under reasonable limits.

In the specification and claims the direction facing the fish line has been designated as the forward direction and that towards the hook or bait the rearward.

What I claim as new is:

1. A fish lure of the character described for insertion between a fish line and hook comprising, a flexible shank having an eye at each end, a plurality of substantially spherical beads positioned on the shank in contacting relation filling the space between the eyes which latter serve as stops for the bead assembly, and two substantially circular disks of different diameters having central openings larger than the shank but smaller than the diameter of the beads on opposite sides thereof whereby the beads form bearings about which the disks tilt and turn, the disks being curved about an axis of curvature whereby their surfaces form portions of cylinders, the disks being spaced apart by a plurality of beads with their convex cylindrical surfaces facing each other, the smaller disk having its concave surface facing forwardly.

2. A fish lure of the character described for insertion between a fish line and hook comprising, a flexible shank having an eye at each end, a plurality of substantially spherical beads positioned on the shank in contacting relation, filling the space between the eyes, said eyes serving as stops for the bead assembly, and two substantially circular disks of different diameters having central openings larger than the shank but smaller than the diameter of the beads; whereby, the beads form bearings about which the disks tilt, wobble and turn, said disks being curved with their convex surfaces facing each other said disk being spaced by a plurality of the beads and with the concave surface of the large disk facing the hook.

3. A device in accordance with claim 2 in which the beads are held together between the ends of the shank sufficiently tight to prevent the edge of the central opening in each of the disks from coming in contact with the shank.

(References on following page)

References Cited in the file of this patent

UNITED STATES PATENTS

| Number | Name | Date |
|---|---|---|
| 118,772 | Camp | Sept. 5, 1871 |
| 1,297,354 | Jay | Mar. 18, 1919 |
| 1,620,972 | Hobbs | Mar. 15, 1927 |
| 1,897,529 | Palmer et al. | Feb. 14, 1933 |
| 2,056,506 | Dopp | Oct. 6, 1936 |
| 2,137,235 | Carothers | Nov. 22, 1938 |
| 2,212,772 | Graves | Aug. 27, 1940 |
| 2,610,429 | Thomas | Sept. 16, 1952 |

FOREIGN PATENTS

| Number | Country | Date |
|---|---|---|
| 198,571 | Great Britain | June 7, 1923 |